US009253213B2

(12) United States Patent
Rodniansky

(10) Patent No.: US 9,253,213 B2
(45) Date of Patent: Feb. 2, 2016

(54) QUERY FLOW RECONSTRUCTION IN DATABASE ACTIVITY MONITORING SYSTEMS

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/107,003

(22) Filed: Dec. 16, 2013

(65) Prior Publication Data
US 2015/0172319 A1    Jun. 18, 2015

(51) Int. Cl.
| G06F 17/00 | (2006.01) |
| G06F 7/04 | (2006.01) |
| G06F 7/00 | (2006.01) |
| H04L 29/06 | (2006.01) |
| G06F 17/30 | (2006.01) |
| G06F 21/62 | (2013.01) |

(52) U.S. Cl.
CPC .......... *H04L 63/20* (2013.01); *G06F 17/30424* (2013.01); *G06F 21/6227* (2013.01); *G06F 21/62* (2013.01); *G06F 21/6218* (2013.01); *H04L 63/08* (2013.01); *H04L 63/10* (2013.01)

(58) Field of Classification Search
CPC ......... H04L 63/20; H04L 63/08; H04L 63/10; G06F 21/6218; G06F 21/62
USPC .......................................... 726/1, 3; 707/694
See application file for complete search history.

(56) References Cited

U.S. PATENT DOCUMENTS

| 5,978,788 A | 11/1999 | Castelli et al. |
| 7,386,557 B2 | 6/2008 | Barga et al. |
| 7,483,889 B2 | 1/2009 | Wang et al. |
| 2012/0246730 A1* | 9/2012 | Raad .............................. 726/25 |
| 2012/0323826 A1* | 12/2012 | Przytula et al. ................. 706/12 |
| 2014/0165206 A1* | 6/2014 | Hadley ............................ 726/25 |

OTHER PUBLICATIONS

IBM, "InfoSphere Guardium Data Activity Monitor", provided in the main idea on Jul. 23, 2013, <http://www-03.ibm.com/software/products/us/en/infosphere-guardium-data-activity-monitor>.

* cited by examiner

*Primary Examiner* — Aravind Moorthy
(74) *Attorney, Agent, or Firm* — Noah A. Sharkan

(57) ABSTRACT

Embodiments of the present invention disclose a method, computer program product, and system for reconstructing a sequence of communications that occurred during a period of database activity monitor unavailability. A database activity monitor receives a first sequence of queries. The database activity monitor determines whether the database activity monitor became unavailable, and, in response to determining that the database activity monitor is unavailable, restarts the database activity monitor. The database activity monitor receives a second sequence of queries, and approximates a third sequence of queries, wherein the third sequence of queries occurred subsequent to the first sequence of queries and prior to the second sequence of queries. The database activity monitor validates the third sequence of queries with reference to a set of security policies.

17 Claims, 6 Drawing Sheets

QUERY FLOW RECONSTRUCTION IN DATABASE ACTIVITY MONITORING SYSTEMS

TECHNICAL FIELD

The present invention relates generally to the field of database management, and more particularly to reconstructing the flow of queries after a loss of database activity monitor availability.

BACKGROUND

Database activity monitoring is a database security technology for monitoring and analyzing database activity in near real time. Programs for database activity monitoring typically operate independently of the database management system, which is a software system designed to allow the definition, creation, querying, update, and administration of objects on a database. Typical programs for database activity monitoring operate using an interception based method of monitoring database activity. In the interception based method, a client sends queries to a database, which are intercepted by a database activity monitor. Once intercepted, the query data is parsed in order to determine the type of query and the database object affected by the query. Programs for database activity monitoring have the ability to compare the intercepted query with a predefined set of security policies. If the program determines that the intercepted query violates an established security policy, then the program sends an alert to the database security administrator that a query violates an established security policy.

SUMMARY

Embodiments of the present invention disclose a method, computer program product, and system for reconstructing a sequence of queries that occurred during a period of database activity monitor unavailability. A database activity monitor receives a first sequence of queries. The database activity monitor determines whether the database activity monitor became unavailable, and, in response to determining that the database activity monitor is unavailable, restarts the database activity monitor. The database activity monitor receives a second sequence of queries. The database activity monitor approximates a third sequence of queries, wherein the third sequence of queries occurred subsequent to the first sequence of queries and prior to the second sequence of queries. The database activity monitor validates the third sequence of queries with reference to a set of security policies.

DETAILED DESCRIPTION

Figure 1:
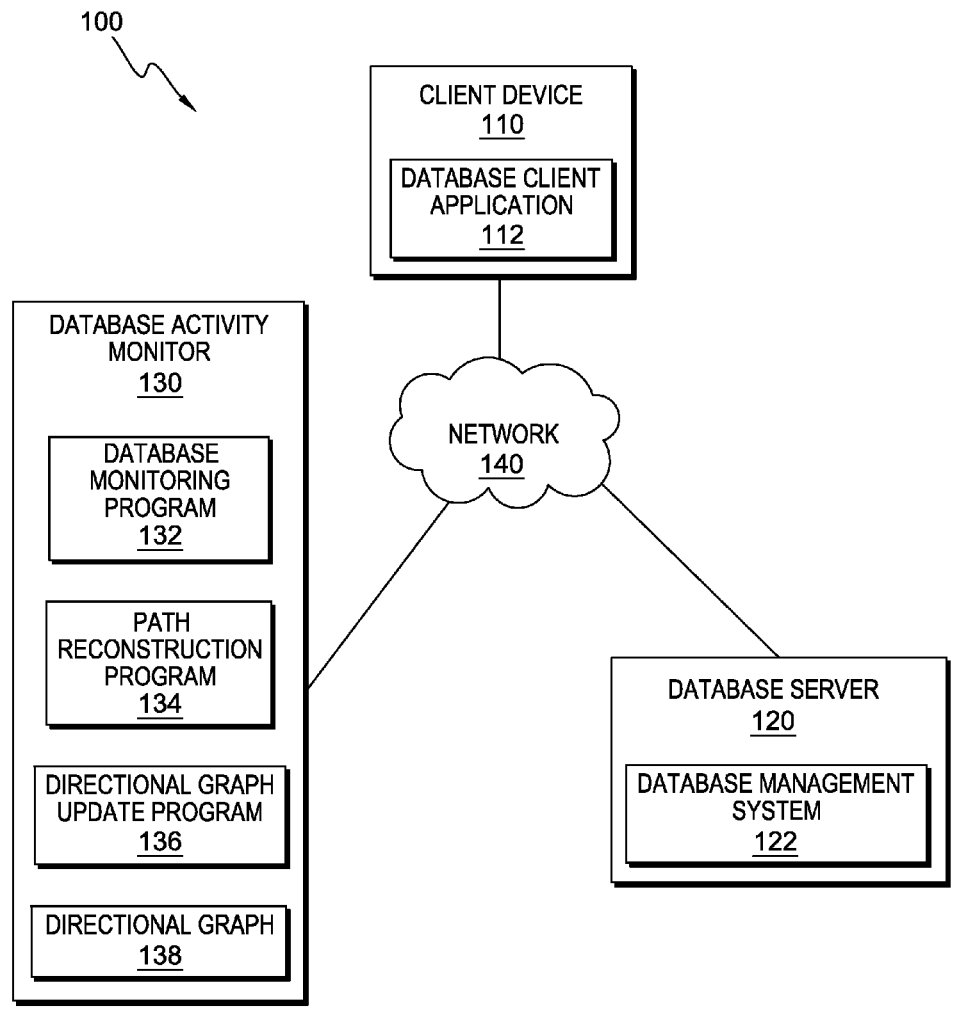
FIG. 1 is a functional block diagram illustrating a simplified client-database environment, in accordance with an embodiment of the present invention.

Embodiments of the present invention recognize that database users who store sensitive information on databases often rely on continuous database activity monitoring to ensure compliance with security policies. While database activity monitors are generally high availability systems, periods of unavailability occur in some circumstances. Embodiments of the present disclosure describe a method, program product, and system for reconstructing information exchanges between clients and databases during a period of unavailability of the database activity monitor in order to ensure that those queries comply with established security policies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a simplified client-database environment, generally designated 100, in accordance with an embodiment of the present invention.

In a first embodiment, client-database environment 100 includes client device 110, database server 120, and database activity monitor 130 all connected via network 140. Network 140 can be, for example, a local area network (LAN), a wide area network (WAN), such as the Internet, or a combination of the two, and may include wired, wireless, fiber optic or any other connection known in the art. In general, the communication network can be any combination of connections and protocols that will support communication between client device 110, database server 120, and database activity monitor 130. In various embodiments of the present invention, client device 110, database server 120, and database activity monitor 130 can each respectively be a server, a laptop computer, a tablet computer, a netbook computer, a personal computer (PC), or a desktop computer, or any other programmable electronic device capable of communicating via network 140. In another embodiment, client device 110, database server 120, and database activity monitor 130 represent a computing system utilizing clustered computers and components to act as a single pool of seamless resources. Client device 110, database server 120, and database activity monitor 130 may include internal and external hardware components, as depicted and described in further detail with respect to FIG. 6.

Client device 110 includes database client application 112. In one embodiment, database client application 112 is a computer program that initiates contact with database server 120, via network 140, in order to make use of objects stored on database server 120. Database server 120 includes database management system 122. Database management system 122 is a software system designed to allow the definition, creation, querying, update, and administration of database server 120.

In one embodiment, database management system 122 may be either a general-purpose database management system or a special-purpose database management system. General-purpose management systems aim to meet the needs of multiple database clients and therefore are well suited to multiple database clients with varying needs. Special-purpose database management systems perform specific database tasks for the database client. For example, a special-purpose database management system may only support database activity related to an email.

In an illustrative embodiment, database activity monitor 130 includes database monitoring program 132, path reconstruction program 134, and directed graph update program 136. Database monitoring program 132 intercepts queries sent from client device 110 to database server 120. Database monitoring program 132 also parses the intercepted queries in order to determine the type of query as well as the object stored on database server 120 that the query affects. Database monitoring program 132 validates the instructions contained in the query against a predetermined set of security policies. If database monitoring program 132 determines that a query violates a security policy, then database monitoring program 132 alerts the database security administrator that a violation occurred. Database monitoring program 132 constructs and maintains a directed graph, such as directed graph 138, that models all known paths of execution (i.e. complete sequences of queries between session begin and session end) that describe interactions between client device 110 and database server 120.

In one embodiment, database activity monitor 130 includes path reconstruction program 134. Path reconstruction program 134 reconstructs the most probable process path followed by the queries between client device 110 and database server 120 following a period of unavailability of database activity monitor 130. In one embodiment, path reconstruction program 134 records queries between client device 110 and database server 120 before and after the period of unavailability and, based on those queries, calculates the probabilities of possible paths that the queries may have followed during the period of unavailability. Path reconstruction program 134 verifies the queries of the most probable paths against the predetermined security policies and, in the event of a violation, issues an alert. In another embodiment, Database monitoring program 132 records queries between client device 110 and database server 120 before and after a period of unavailability. Path reconstruction program 134 accesses the recorded queries in order to calculate the most probable path that the queries may have followed during the period of unavailability and verifies each query in that path with the predetermined security policies.

Database activity monitor 130 includes directed graph update program 136. Directed graph update program 136 accesses directed graph 138, which describes the known paths of execution that describe possible sequences of client queries that client device 110 may send to database server 120. In one embodiment, database monitoring program 132 constructs directed graph 138 over a period of time by monitoring queries between client device 110 and database server 120 and updating directed graph 138 each time database monitoring program 132 encounters a previously unknown sequence of queries. In another embodiment, a user constructs directed graph 138 and uploads directed graph 138 to database activity monitor 130 for use by other programs stored thereon.

Directed graph update program 136 intercepts sequences of client queries from client device 110 and compares the intercepted sequences to directed graph 138. If directed graph update program 136 determines that the intercepted sequence of client queries is not included in the known paths that make up directed graph 138, then database activity monitor 130 updates directed graph 138. In another embodiment, path reconstruction program 134, directed graph update program 136, directed graph 138, or any combination thereof, are stored on a remote database server, such as database server 120, and are downloaded to a computer storage medium on database activity monitor 130 via network 140. It should be appreciated by those of skill in the art that other elements other than those explicitly listed can be present in other implementations.

Figure 2:
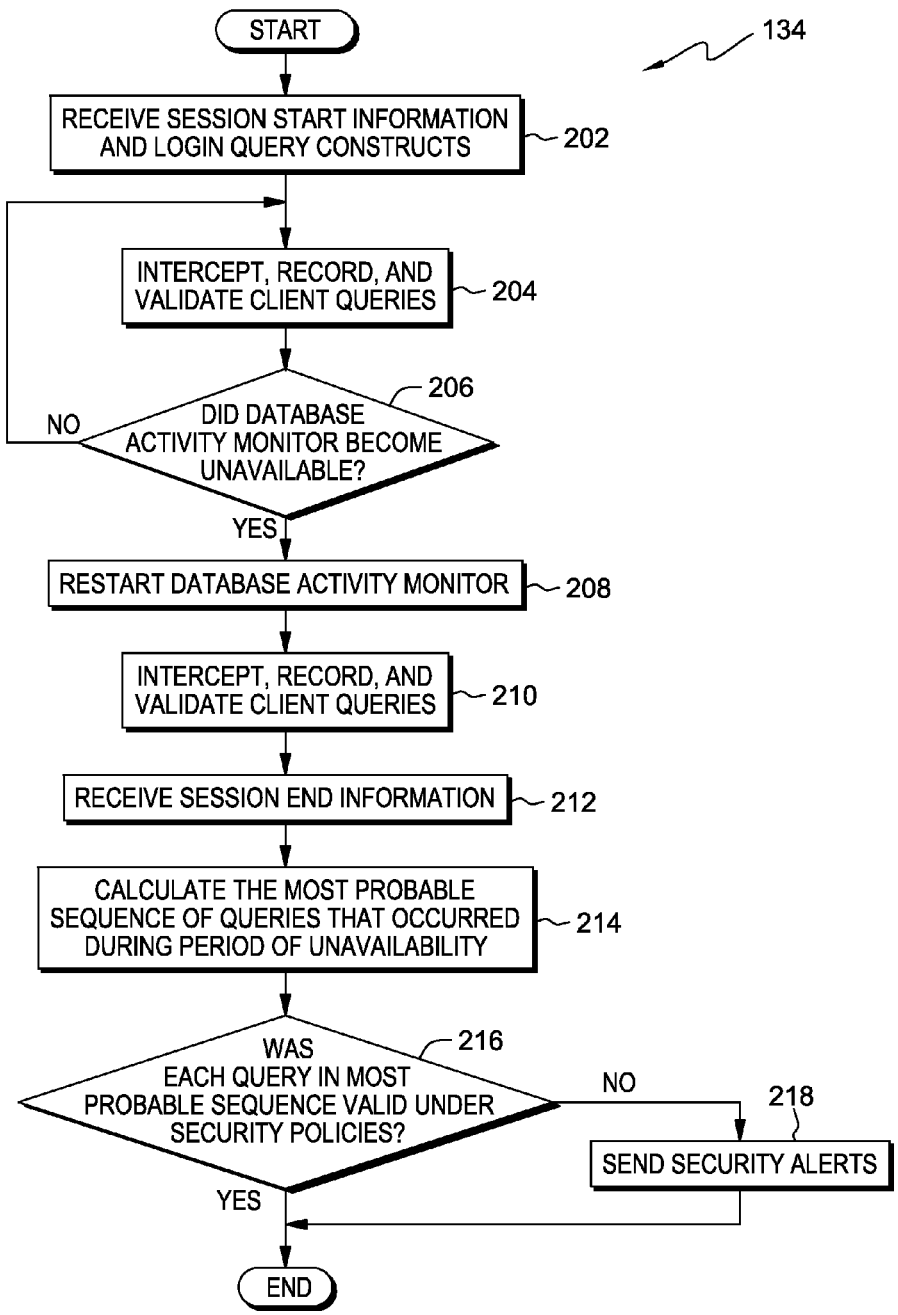
FIG. 2 is a flowchart depicting processes of a path reconstruction program, in accordance with an embodiment of the present invention.

FIG. 2 is a flowchart depicting processes of path reconstruction program 134, executing on database activity monitor 130 in accordance with an embodiment of the present invention.

Database activity monitor 130 receives session start information and login query constructs (process 202). A query construct is a formal request from a client device, such as client device 110, to a database, such as database server 120, for information. In one embodiment database activity monitor 130 intercepts session start information and login query constructs sent by client device 110. The session start information includes information regarding client device 110 such as a client user name or identifier. In one embodiment, the session start information instructs database activity monitor 130 to load a predetermined set of security policies that apply to client device 110. In another embodiment, the session start information defines the beginning of the client-server session and denotes the point from which database activity monitor 130 begins verifying the queries sent by client device 110. The login query constructs include the possible first queries that client device 110 can send to database server 120 once a database server session begins.

Database activity monitor 130 intercepts, records and validates client queries (process 204). Database activity monitor 130 intercepts queries sent by client device 110 to database server 120, records the queries, and validates the queries against a set of predefined security policies. The predefined security policies include a set of rules that identify the query constructs that a particular client device is permitted to perform in the database server. For example, in one embodiment, client device 110 has read only access to database server 120. In this embodiment, if client device 110 sends a query to database server 120 that does anything other than merely read data stored on database server 120, such as write new information, then database activity monitor 130 determines that this query is not valid and alerts the database security administrator that an invalid query was sent.

Database activity monitor 130 determines whether database activity monitor 130 became unavailable (decision block 206). Database activity monitor 130 has the potential to lose connectivity for a brief period of time during which database activity monitor 130 fails to monitor the queries sent by client device 110 to database server 120. In one embodiment, database activity monitor 130 becomes unavailable, but the unavailability of database activity monitor 130 does not end the database server session between client device 110 and database server 120. Therefore, during the period of unavailability, client device 110 continues to send queries to database server 120 that are not validated by database activity monitor 130. If database activity monitor 130 determines that database activity monitor 130 did not become unavailable (decision block 206, no branch), then database activity monitor 130 returns to intercept, record, and validate client queries in process 204. If database activity monitor 130 determines that it did become unavailable (decision block 206, yes branch), then database activity monitor 130 proceeds to restart itself in process 208. Database activity monitor 130 intercepts, records, and validates client queries (process 210). Following a restart, database activity monitor 130 continues to intercept, record, and validate client queries against the predetermined security policies.

Database activity monitor 130 receives database server session end information (process 212). Client device 110 concludes the database server session with database server 120 and sends session end information. Database activity monitor 130 intercepts a communication containing the session end information. The database server session end information instructs database activity monitor 130 to conclude the validation of future queries from client device 110 with the predetermined security policies.

Database activity monitor 130 calculates the most probable sequence of queries that occurred during the period or periods of unavailability, if any occurred (process 214). In an illustrative embodiment, database activity monitor 130 compares all of the recorded client queries that occurred prior to the period of unavailability with the execution paths included in directed graph 138 in order to obtain an initial query flow sequence. In the illustrative embodiment, database activity monitor 130 compares the client queries recorded after the period of unavailability with the execution paths included in directed graph 138 stored on database activity monitor 130 in order to obtain a final query flow sequence.

Based on the initial query flow sequence and the final query flow sequence, database activity monitor 130 determines all known paths through directed graph 138 from the initial query flow sequence to the final query flow sequence. In one embodiment, directed graph 138 is represented by a Bayesian network in which each query construct represents a node in the network and has an associated probability which represents the probability that, given a set of initial conditions, such as initial query flow sequence, the query construct will be the next query sent by client device 110. Based on the probabilities associated with each query construct in directed graph 138, database activity monitor 130 determines the most probable sequence of queries sent by client device 110 during the period of unavailability. As will be appreciated by one of skill in the art, other data structures may be used to implement the disclosed invention. The specific embodiments described herein are not intended to be limiting.

Database activity monitor 130 determines whether each query in the most probable sequence of queries is valid under the predetermined security policies (decision block 216).

Database activity monitor 130 makes this determination by, for example, comparing the type of each query in the most probable sequence of queries with a list of queries that client device 110 has permission to make included in the predefined set of security policies. If database activity monitor 130 determines that each query in the most probable sequence of queries was valid under the predetermined security policies (decision block 216, yes branch), then path reconstruction program 134 terminates. If database activity monitor 130 determines that one or more queries in the most probable sequence of queries violates a predetermined security policy (decision block 216, no branch), then database activity monitor 130 sends a security alert in process 218.

Figure 3:
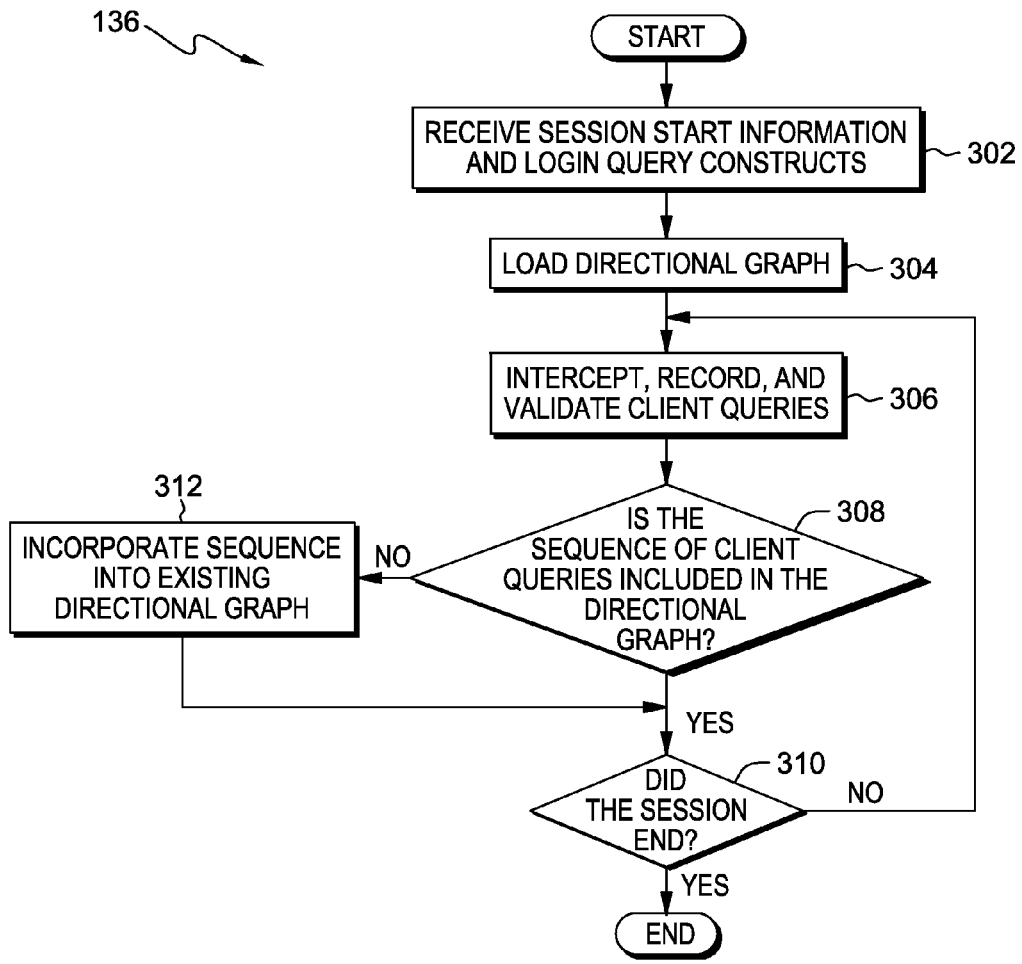
FIG. 3 is a flowchart depicting processes of a directed graph update program, in accordance with an embodiment of the present invention.

FIG. 3 is a flowchart depicting processes of directed graph update program 136, executing on database activity monitor 130, in accordance with an embodiment of the present invention.

Database activity monitor 130 receives session start information and login query constructs (process 302). In one embodiment, client device 110 sends the session start information and the login query constructs to database activity monitor 130. The session start information includes information regarding client device 110, such as a client user name or identifier. In one embodiment, the session start information instructs database activity monitor 130 to load a predetermined set of security policies that apply to client device 110. In one embodiment, the session start information defines the beginning of the client-server session and denotes the point from which database activity monitor 130 begins verifying the queries sent by client device 110. The login query constructs include the possible first queries that client device 110 can send to database server 120 once a database server session begins.

Database activity monitor 130 loads a directed graph (process 304). The directed graph, such as directed graph 138, represents all of the known possible paths of execution that can occur during a database server session. For example, in one embodiment, directed graph 138 is represented by a Bayesian network in which each query construct represents a node in the network and has an associated probability which represents the probability that, given a set of initial conditions, such as initial query flow sequence, the query construct will be the next query sent by client device 110. In this embodiment, each node in directed graph 138 is a particular query construct and each edge, which connects two nodes, represents the order in which the query constructs are executed.

Database activity monitor 130 intercepts and records a sequence of client queries (process 306). In one embodiment, client device 110 sends a sequence of queries to database server 120 using, for example, structured query language (SQL). Database activity monitor 130 receives the sequence of queries and stores the sequence in memory.

Database activity monitor 130 determines whether the sequence of client queries is included in the directed graph (decision block 308). Database activity monitor 130 makes the determination by, for example, comparing the sequence of queries to the known execution paths in directed graph 138 to locate a subset of the directed graph that includes the sequence of queries. If database activity monitor 130 determines that the sequence of client queries is included in directed graph 138 (decision block 308, yes branch), then database activity monitor 130 determines whether the database server session has ended in process 310. If database activity monitor 130 determines that the sequence of queries is not included in directed graph 138 (decision block 308, no branch), then database activity monitor 130 incorporates the sequence into the existing directed graph in process 312. Database activity monitor 130 updates directed graph 138 by, for example, adding new nodes for each query that is in the sequence, but not included in an execution path in directed graph 138 and adding edges to connect the nodes to describe the order of the sequence.

Subsequent to updating directed graph 138, database activity monitor 130 determines whether the database server session ended (process 310). If database activity monitor 130 determines that the session did not end (decision block 310, no branch), then database activity monitor 130 intercepts and records a new sequence of client queries in process 306. If database activity monitor 130 determines that the session has ended (decision block 310, yes branch), then database activity monitor 130 ceases execution of directed graph update program 136.

Figure 4:
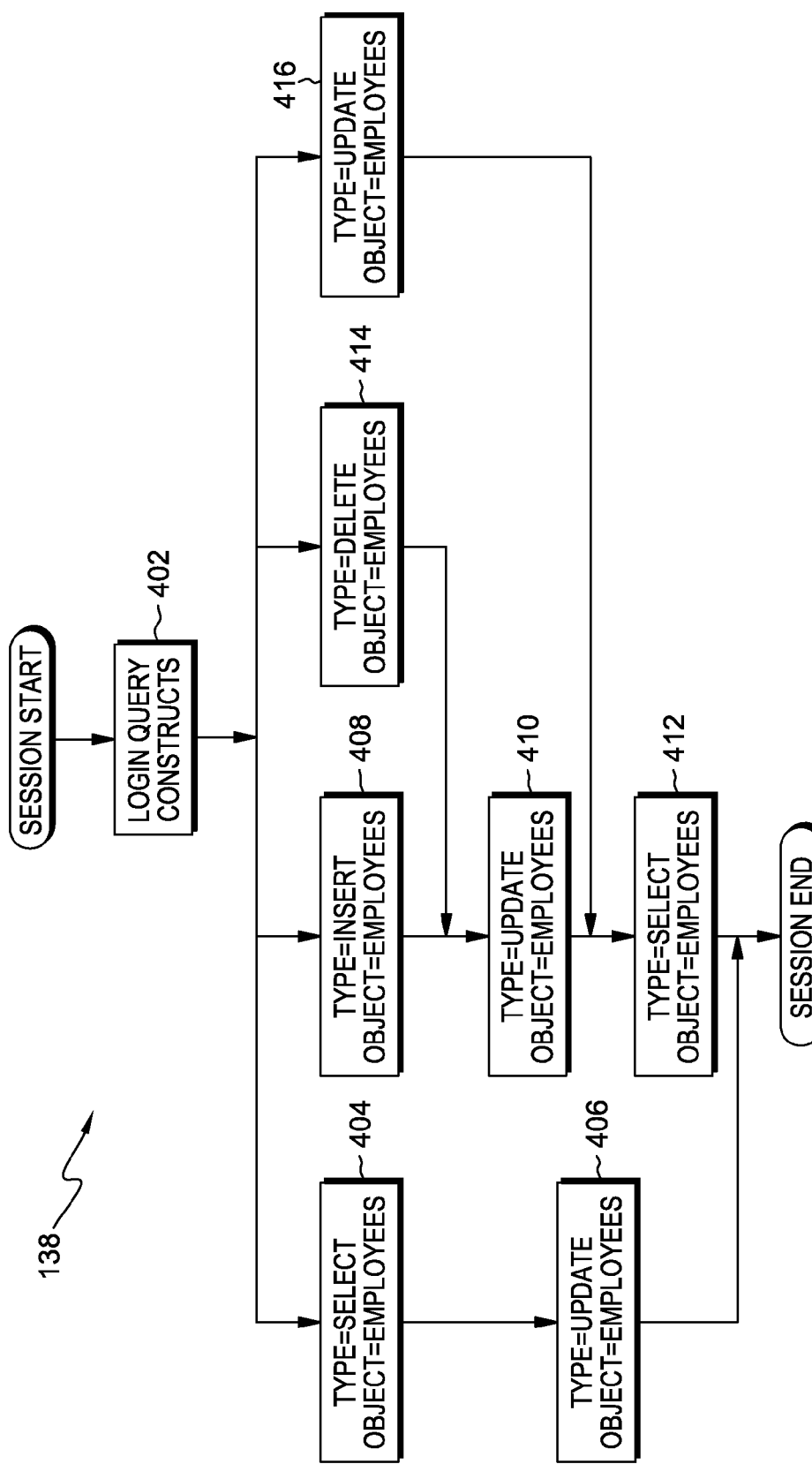
FIG. 4 depicts directed graph, in accordance with an embodiment of the present invention.

FIG. 4 depicts a directed graph, in accordance with an embodiment of the present invention. Directed graph 138 is a graph that includes all of the known sequences of client queries that client device 110 can send to database server 120. Each of the nodes in directed graph 138 are query constructs which include information about the query such as the type of information requested or sent, and the object to which the query applies. In this embodiment, all execution paths begin with a session start and conclude with a session end. All queries in the depicted embodiment relates to an object called "EMPLOYEES", which can be stored on database server 120.

Block 402 includes a set of login query constructs. Login query constructs include, for example, indentifying information about client device 110 and information regarding predetermined security policies that apply to queries sent by client device 110 to database server 120. Following the login query constructs, there are four possible paths that client device 110 can initiate by sending queries to database server 120. The four possible paths correspond to the query sent by client device 110 and include "SELECT", "INSERT", "DELETE", and "UPDATE", each represented, respectively, by blocks 404, 408, 414, and 416.

If the first query sent by client device 110 is the "SELECT" type represented by block 404, then the next query sent by client device 110 is expected to be an "UPDATE" type query, as in block 406. Similarly, if the first query sent by client device 110 is either an "INSERT" type, as in block 408, or a "DELETE" type query, as in block 414, then the remainder of the session is predicted to consist of an "UPDATE" type query, as in block 410, followed by a "SELECT" type query, as in block 412. If the first query sent by client device 110 is an "UPDATE" type query, as in block 416, then the next query is expected to be a "SELECT" type query, as in block 412. In the event that database activity monitor 130 intercepts a sequence of queries that does not represent a subset of directed graph 138, then database activity monitor 130 updates the directed graph by executing the processes depicted in FIG. 3.

In an illustrative example, database activity monitor 130 becomes unavailable after receiving an "INSERT" type query, as in block 408, and an "UPDATE" type query as in block 410, and restarts itself in time to receive a "SELECT" type query, as in block 412, followed by the end of the session. Following the period of unavailability, database activity monitor 130 executes path reconstruction program 134, to determine which queries, if any, were likely missed during the period of unavailability. In the illustrative example, path reconstruction program 134 identifies a missed "UPDATE" type query, as in block 410, which database activity monitor 130 then validates using predetermined security policies.

Figure 5:
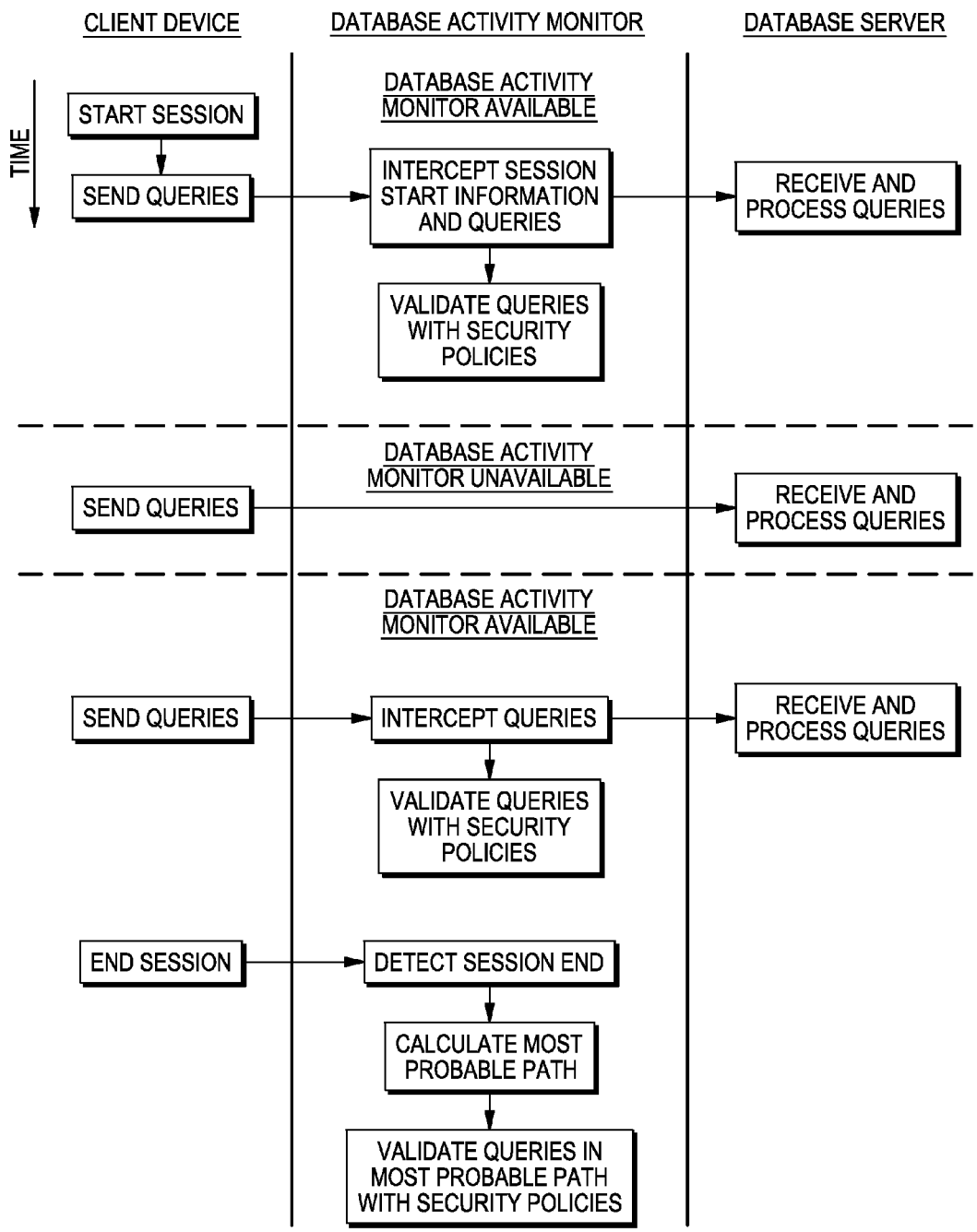
FIG. 5 depicts a series of communications between a client device, a database activity monitor, and a database server, in accordance with an embodiment of the present invention.

FIG. 5 depicts a series of communications between client device 110, database activity monitor 130 executing path reconstruction program 134, and a database server, in accordance with an embodiment of the present invention. FIG. 5 depicts the sequence of communications in three distinct periods of time. During the first period of time, database activity monitor 130 is available. Database activity monitor 130 intercepts and validates queries sent by client device 110 before delivering the queries to database server 120. During the second period of time, database activity monitor 130 is unavailable and therefore not intercepting queries sent by client device 110. During the second period of time, client device 110 sends queries directly to database server 120. During the third period of time, database activity monitor 130 is available again. Database activity monitor 130 intercepts and validates queries sent by client device 110 until it detects that client device 110 ended the session. Database activity monitor 130 then calculates the most probable path representing queries sent during the period of unavailability and validates the calculated path with predetermined security policies.

Figure 6:
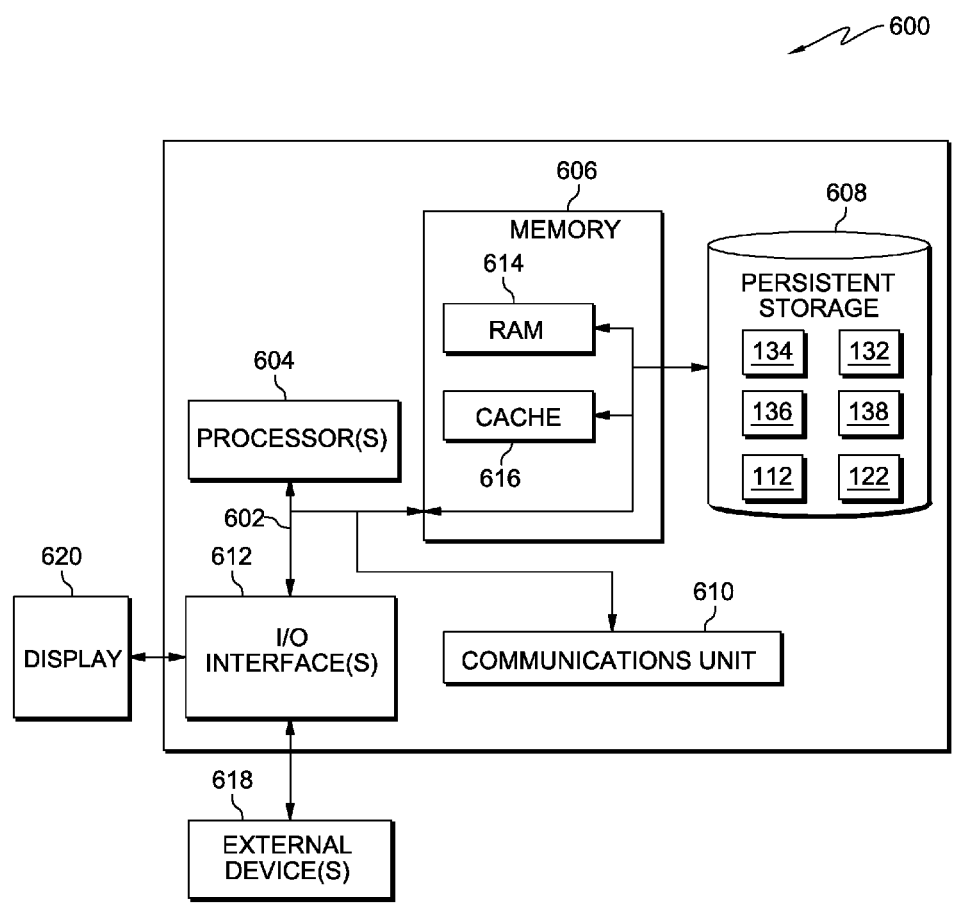
FIG. 6 depicts a block diagram of components of the computer executing the path reconstruction program, in accordance with an embodiment of the present invention.

FIG. 6 depicts a block diagram of respective components, generally designated 600, of database activity monitor 130 as well as client device 110 and database server 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Database activity monitor 130, client device 110, and database server 120 include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile, computer-readable storage media.

Database client application 112, database management system 122, database monitoring program 132, path reconstruction program 134, directed graph update program 136, and directed graph 138 are stored in persistent storage 608 for execution by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of client device 110, database server 120, and database activity monitor 130. In these examples, communications unit 610 includes one or more network interface cards. Communications unit 610 may provide communications through the use of either or both physical and wireless communications links. Database client application 112, database management system 122, database monitoring program 132, path reconstruction program 134, directed graph update program 136, and directed graph 138 may be downloaded to persistent storage 608 through communications unit 610.

I/O interface(s) 612 allows for input and output of data with other devices that may be connected to client device 110, database server 120, and database activity monitor 130. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present invention, e.g., path reconstruction program 134 and directed graph update program 136, can be stored on such portable computer-readable storage media and can be loaded onto persistent storage 608 via I/O interface(s) 612. I/O interface(s) 612 also connects to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reconstructing a sequence of queries that occurred during a period of database activity monitor unavailability, the method comprising:

receiving, by one or more computer processors, a first sequence of queries;

determining, by one or more computer processors, whether the database activity monitor became unavailable;

receiving, by one or more computer processors, a second sequence of queries;

determining, by one or more computer processors, a probable sequence of queries that occurred in a period of time during which the database activity monitor was unavailable to validate queries, wherein the probable sequence of queries fit temporally subsequent to the first sequence of queries and prior to the second sequence of queries; and validating, by one or more computer processors, the probable sequence of queries with reference to a set of security policies.

2. The method of claim 1, wherein determining the probable sequence of queries comprises comparing, by one or more computer processors, the first and second sequences of queries to a directed graph, wherein the directed graph includes known possible sequences of queries.

3. The method of claim 2, wherein the directed graph is a Bayesian network.

4. The method of claim 1, further comprising:
comparing the first sequence of queries to a directed graph of known possible sequences of queries;
determining whether the first sequence of queries is included in a directed graph of a plurality known possible sequences of queries; and
in response to determining that the first sequence of queries is not included in the directed graph, updating the directed graph to include the first sequence of queries.

5. The method of claim 1, further comprising:
sending a security alert if the probable sequence of queries is not valid under the set of security policies.

6. A computer program product for reconstructing a sequence of queries that occurred during a period of database activity monitor unavailability, the computer program product comprising:
one or more computer-readable hardware storage devices and program instructions stored on the one or more computer-readable hardware storage devices, the program instructions comprising:
program instructions to receive a first sequence of queries;
program instructions to determine whether the database activity monitor became unavailable;
program instructions to receive a second sequence of queries;
program instructions to approximate a third sequence of queries that occurred in a period of time during which the database activity monitor was unavailable to validate queries, wherein the third sequence of queries fit temporally subsequent to the first sequence of queries and prior to the second sequence of queries; and
program instructions to validate the third sequence of queries with reference to a set of security policies.

7. The computer program product of claim 6, wherein the program instructions determine the probable sequence of queries comprise program instructions to:
compare the first and second sequences of queries to a directed graph, wherein the directed graph includes known possible sequences of queries.

8. The computer program product of claim 7, wherein the directed graph is a Bayesian network.

9. The computer program product of claim 6, further comprising program instructions to:
compare the first sequence of queries to a directed graph of a plurality known possible sequences of queries;

determine whether the first sequence of queries is included in a directed graph of a plurality known possible sequences of queries; and
in response to determining that the first sequence of queries is not included in the directed graph, update the directed graph to include the first sequence of queries.

10. The computer program product of claim 6, further comprising:
program instructions to send a security alert if the probable sequence of queries is not valid under the set of security policies.

11. The computer program product of claim 6, wherein the program instructions are stored in a computer-readable hardware storage device in a database server, and wherein the program instructions were downloaded over a network from the database server.

12. The computer program product of claim 6, wherein the program instructions are stored in a computer-readable hardware storage device in a database server, and wherein the program instructions are downloaded over a network to a remote database server for use in a computer-readable hardware storage device with the remote system.

13. A computer system for reconstructing a sequence of queries that occurred during a period of database activity monitor unavailability, the computer system comprising:
at least one processor;
a tangible, computer-readable memory for storing program instructions which, when executed by the processor, perform the steps of:
receiving, by one or more computer processors, a first sequence of queries;
determining, by one or more computer processors, whether the database activity monitor became unavailable;
receiving, by one or more computer processors, a second sequence of queries;
determining, by one or more computer processors, a probable sequence of queries that occurred in a period of time during which the database activity monitor was unavailable to validate queries, wherein the probable sequence of queries fit temporally subsequent to the first sequence of queries and prior to the second sequence of queries; and
validating, by one or more computer processors, the probable sequence of queries with reference to a set of security policies.

14. The computer system of claim 13, wherein the step of determining the probable sequence of queries comprises comparing the first and second sequences of queries to a directed graph, wherein the directed graph includes known possible sequences of queries.

15. The computer system of claim 14, wherein the directed graph is a Bayesian network.

16. The computer system of claim 13, further comprising:
comparing the first sequence of queries to a directed graph of a plurality known possible sequences of queries;
determining whether the first sequence of queries is included in a directed graph of a plurality known possible sequences of queries; and
in response to determining that the first sequence of queries is not included in the directed graph, updating the directed graph to include the first sequence of queries.

17. The computer system of claim 13, further comprising:
sending a security alert if the probable sequence of queries is not valid under the set of security policies.

* * * * *